US008369321B2

(12) United States Patent
Aybay

(10) Patent No.: US 8,369,321 B2
(45) Date of Patent: Feb. 5, 2013

(54) APPARATUS AND METHODS RELATED TO THE PACKAGING AND CABLING INFRASTRUCTURE OF A DISTRIBUTED SWITCH FABRIC

(75) Inventor: Gunes Aybay, Los Altos, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 465 days.

(21) Appl. No.: 12/752,704

(22) Filed: Apr. 1, 2010

(65) Prior Publication Data
US 2011/0243031 A1 Oct. 6, 2011

(51) Int. Cl.
H04L 12/56 (2006.01)
(52) U.S. Cl. .................... 370/388; 370/254; 370/380
(58) Field of Classification Search .............. 370/254, 370/380, 388
See application file for complete search history.

(56) References Cited

U.S. PATENT DOCUMENTS

| 3,683,238 | A | * | 8/1972 | Olds et al. ............... 361/786 |
| 3,978,291 | A | * | 8/1976 | Bergeron et al. ........... 379/16 |
| 4,722,603 | A | | 2/1988 | Graebner et al. |
| 4,983,961 | A | * | 1/1991 | Brunle et al. ............. 340/2.22 |
| 5,138,615 | A | | 8/1992 | Lamport et al. |
| 5,504,739 | A | * | 4/1996 | Chopping ................. 370/372 |
| 5,557,506 | A | * | 9/1996 | Wood et al. ............... 361/796 |
| 5,801,641 | A | | 9/1998 | Yang et al. |
| 5,926,473 | A | | 7/1999 | Gridley |
| 5,987,028 | A | | 11/1999 | Yang et al. |
| 5,991,295 | A | | 11/1999 | Tout et al. |
| 6,049,542 | A | | 4/2000 | Prasad |
| 6,075,773 | A | | 6/2000 | Clark et al. |
| 6,539,027 | B1 | | 3/2003 | Cambron |
| 6,614,236 | B1 | | 9/2003 | Karam |
| 6,636,511 | B1 | | 10/2003 | Roy et al. |
| 6,704,307 | B1 | | 3/2004 | Graves et al. |
| 6,816,486 | B1 | | 11/2004 | Rogers |
| 6,824,312 | B2 | * | 11/2004 | McClellan et al. ........... 385/88 |
| 6,868,082 | B1 | | 3/2005 | Allen, Jr. et al. |

(Continued)

FOREIGN PATENT DOCUMENTS
EP 1 892 905 A1 2/2008

OTHER PUBLICATIONS

Electronic design, "Optimized Interconnect Eliminates Limits in Orthogonal Architectures" [online] [retrieved on Nov. 5, 2008] Retrieved from the Internet: <URL: http://electronicdesign.com/Articles/Print.cfm?AD=1&ArticleID=13277>, (10 pgs).

(Continued)

Primary Examiner — Hassan Kizou
Assistant Examiner — Emmanuel Maglo
(74) Attorney, Agent, or Firm — Cooley LLP

(57) ABSTRACT

In some embodiments, a system includes a chassis having a group of horizontal slots in which a first group of line cards is disposed and a group of vertical slots in which a second group of line cards is disposed. Each port of a line card from the first group of line cards is operatively coupled to a different line card from the second group of line cards when the system is in a first configuration. A first set of ports and a second set of ports of a line card from the first group of line cards are operatively coupled to a first line card and a second line card from the second group of line cards, respectively, when the system is in a second configuration.

20 Claims, 8 Drawing Sheets

U.S. PATENT DOCUMENTS

| | | | |
|---|---|---|---|
| 6,937,157 B1 * | 8/2005 | Chea et al. ............... 340/686.1 |
| 7,038,135 B1 | 5/2006 | Chan et al. |
| 7,165,120 B1 * | 1/2007 | Giles et al. ............... 709/249 |
| 7,173,931 B2 | 2/2007 | Chao et al. |
| 7,229,020 B2 | 6/2007 | Goodison et al. |
| 7,230,947 B1 | 6/2007 | Huber et al. |
| 7,248,760 B1 | 7/2007 | Corbalis et al. |
| 7,277,429 B2 | 10/2007 | Norman et al. |
| 7,280,356 B2 | 10/2007 | Pfahnl et al. |
| 7,406,038 B1 | 7/2008 | Oelke et al. |
| 7,408,927 B2 | 8/2008 | George |
| 7,415,034 B2 | 8/2008 | Muller et al. |
| 7,496,252 B1 | 2/2009 | Corbalis et al. |
| 7,505,458 B2 | 3/2009 | Menon et al. |
| 7,552,262 B1 | 6/2009 | Turner et al. |
| 7,693,142 B2 | 4/2010 | Beshai |
| 8,184,933 B1 * | 5/2012 | Aybay ............... 385/100 |
| 8,265,071 B2 * | 9/2012 | Sindhu et al. ............... 370/388 |
| 2002/0064170 A1 | 5/2002 | Siu et al. |
| 2002/0181455 A1 | 12/2002 | Norman et al. |
| 2004/0023558 A1 | 2/2004 | Fowler et al. |
| 2005/0058128 A1 | 3/2005 | Carson et al. |
| 2005/0275504 A1 | 12/2005 | Torza |
| 2006/0013207 A1 | 1/2006 | McMillen et al. |
| 2006/0126610 A1 | 6/2006 | Ryan et al. |
| 2006/0165085 A1 | 7/2006 | Konda |
| 2007/0016715 A1 | 1/2007 | Phelps et al. |
| 2007/0140229 A1 | 6/2007 | Tang |
| 2007/0153462 A1 | 7/2007 | Crippen et al. |
| 2008/0044181 A1 | 2/2008 | Sindhu |
| 2008/0112133 A1 | 5/2008 | Torudbakken et al. |
| 2008/0130517 A1 | 6/2008 | Lee et al. |
| 2008/0143379 A1 * | 6/2008 | Norman ............... 326/39 |
| 2008/0151863 A1 | 6/2008 | Lawrence et al. |
| 2008/0159738 A1 | 7/2008 | Lavranchuk |
| 2008/0186875 A1 | 8/2008 | Kitani |
| 2008/0192648 A1 | 8/2008 | Galles |
| 2008/0212472 A1 | 9/2008 | Musacchio et al. |
| 2008/0214059 A1 | 9/2008 | Rothermel et al. |
| 2008/0315985 A1 * | 12/2008 | Johnsen et al. ............... 340/2.22 |
| 2008/0318465 A1 | 12/2008 | Johnsen et al. |
| 2008/0320117 A1 | 12/2008 | Johnsen et al. |
| 2009/0003327 A1 | 1/2009 | Zang et al. |
| 2009/0028229 A1 | 1/2009 | Cagno et al. |
| 2009/0175281 A1 | 7/2009 | Higuchi et al. |
| 2010/0165983 A1 | 7/2010 | Aybay et al. |
| 2010/0165984 A1 | 7/2010 | Aybay et al. |
| 2011/0302346 A1 * | 12/2011 | Vahdat et al. ............... 710/301 |

OTHER PUBLICATIONS

Jonathan S. Turner et al. "Multirate Clos Networks" IEEE Communications Magazine, Oct. 2003, pp. 1-11.

H. Jonathan Chao et al. "Matching Algorithms for Three-Stage Bufferless Clos Network Switches" IEEE Communications Magazine, Oct. 2003, pp. 46-54.

Gunes Aybay et al., "Front-to-Back Cooling System for Modular Systems with Orthogonal Midplane Configuration" U.S. Appl. No. 12/167,604, filed Jul. 3, 2008, (25 pgs).

Search Report for European Application No. 09170037.7, mailed Dec. 10, 2009, 7 pages.

F.K. Liotopoulos et al., "A Modular, 160 Gbps ATM Switch Architecture for Multimedia Networking Support, based on a 3-Stage Clos Network" Proceedings of the International Teletraffic Congress. ITC-16. Teletraffic Engineering in a Competitive World. Edinburgh, UK, Jun. 7, 1999, Amsterdam: Elsevier, NL, vol. 3A, XP000877657 ISBN: 978-0-444-50268-1, pp. 529-538.

Office Action mailed May 25, 2010 for U.S. Appl. No. 12/345,500 (13 pages).

Office Action mailed Jun. 10, 2010 for U.S. Appl. No. 12/345,502 (24 pages.).

Office Action mailed Jun. 8, 2010 for U.S. Appl. No. 12/414,825 (17 pages).

U.S. Appl. No. 12/414,825, filed Mar. 31, 2009 entitled "Distributed Multi-Stage Switch Fabric" (72 pgs).

U.S. Appl. No. 12/564,080, filed Sep. 22, 2009 entitled "Systems and Methods for Identifying Cable Connections in a Computing System" (51 pgs).

U.S. Appl. No. 12/613,313, filed Nov. 5, 2009 entitled "Methods and Apparatus for Upgrading a Switch Fabric" (63 pgs).

* cited by examiner

APPARATUS AND METHODS RELATED TO THE PACKAGING AND CABLING INFRASTRUCTURE OF A DISTRIBUTED SWITCH FABRIC

BACKGROUND

Embodiments described herein relate generally to switch fabrics and more particularly, to the packaging and cabling infrastructure of switch fabrics such as Clos networks.

Clos networks are multi-stage switch networks that provide non-blocking connections between multiple input ports and multiple output ports. A non-blocking network is a network in which a data path through the network can always be established between an idle input port and an idle output port. A three-stage Clos network, for example, has a middle stage connected between an input stage and an output stage. Each stage includes multiple modules. Each input stage module has multiple input ports (n) and is operatively coupled to each middle stage module. Similarly, each output stage module has n output ports and is connected to each middle stage module.

Multiple connections are used to operatively couple the middle stage modules between the input stage modules and the output stage modules. Some known Clos networks use cables to connect the modules. Such cabling can be complex, unorganized and thus, difficult to properly connect and maintain. Other known Clos networks use a midplane disposed between line cards associated with the input stage and the output stage, and line cards associated with the middle stage. In such Clos networks, every position on the midplane to which a line card associated with the middle stage can be coupled includes a line card associated with the middle stage. Accordingly, in switch fabrics that do not use the full capacity of the switch fabric, many middle stage line cards remain underutilized. Such underutilized line cards can take up space, can increase power usage and can be costly.

Thus, a need exists for a switch fabric that is easily connected and maintained. Additionally, a need exists for a switch fabric that can properly and easily be scaled to include the number of switch fabric modules actually used.

SUMMARY

In some embodiments, a system includes a chassis having a group of horizontal slots in which a first group of line cards is disposed and a group of vertical slots in which a second group of line cards is disposed. Each port of a line card from the first group of line cards is operatively coupled to a different line card from the second group of line cards when the system is in a first configuration. A first set of ports and a second set of ports of a line card from the first group of line cards are operatively coupled to a first line card and a second line card from the second group of line cards, respectively, when the system is in a second configuration.

DETAILED DESCRIPTION

Figure 1:
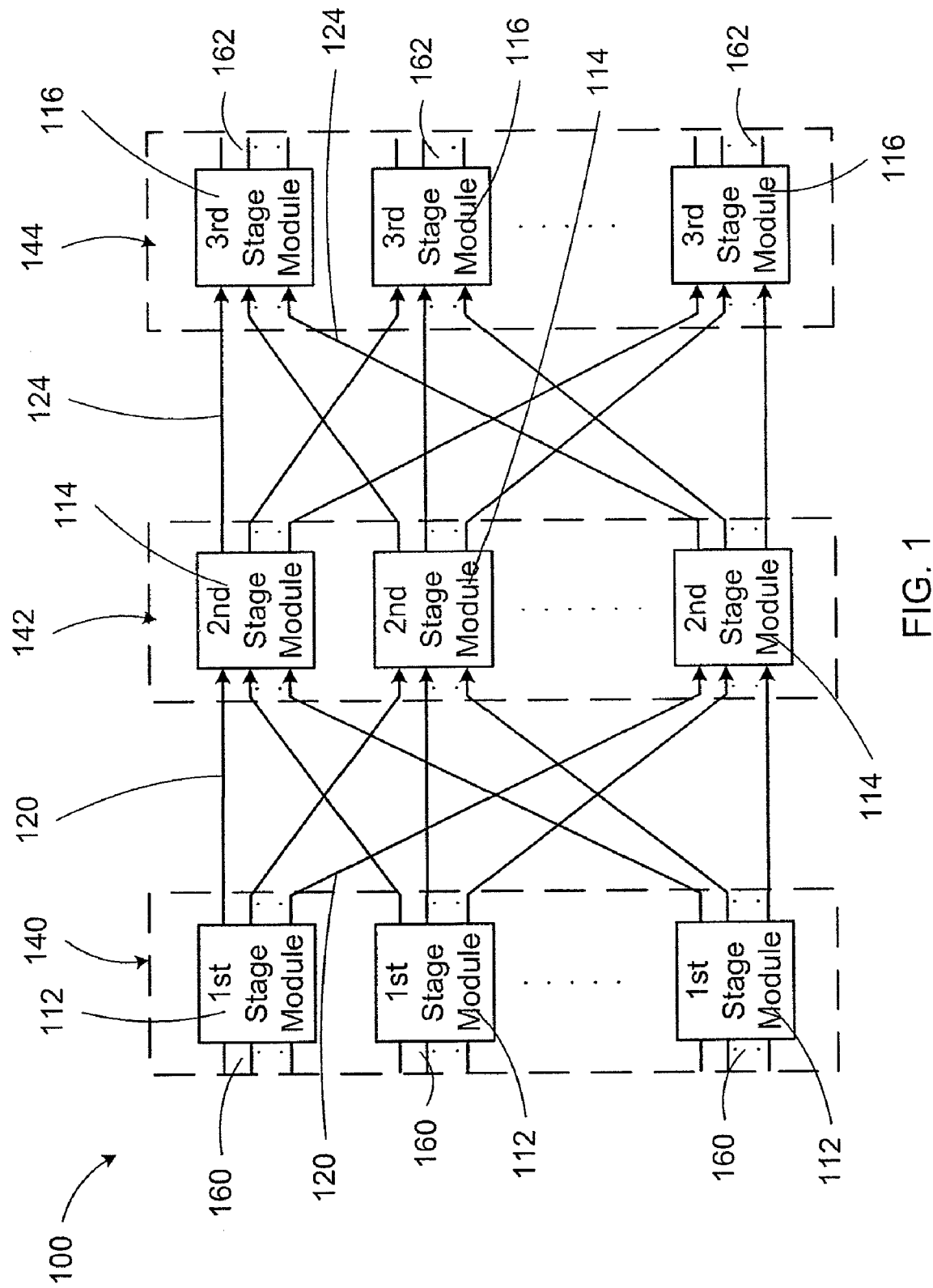
FIG. 1 is a schematic illustration of a switch fabric system, according to an embodiment.

In some embodiments, a system includes a chassis, a first group of line cards, and a second group of line cards. The chassis includes a first portion and a second portion. The first portion defines a group of horizontal slots and the second portion defines a group of vertical slots. The first group of line cards is disposed within the group of horizontal slots. Each line card from the group of line cards has multiple ports and a depth substantially similar to a depth of the chassis. The second group of line cards is disposed within the vertical slots. Each line card from the second group of line cards has multiple ports. Each port of a line card from the first group of line cards is operatively coupled to a different line card from the second group of line cards when the system is in a first configuration. A first set of ports of a line card from the first group of line cards is operatively coupled to a first line card from the second group of line cards and a second set of ports of the line card from the first group of line cards is operatively coupled to a second line card from the second group of line cards when the system is in a second configuration. The first set of ports and the second set of ports are mutually exclusive.

With multiple configurations, a user or system administrator can tailor the system to meet their specific requirements without wasting and/or underutilizing resources. If the user uses greater connectivity, the user can operate the system in the first configuration. If the user uses less connectivity, the user can operate the system in the second configuration. Reconfiguring the system between the first configuration and the second configuration can be accomplished by adding line cards to and/or removing line cards from an existing chassis.

In some embodiments, a system includes a chassis, a first line card, a second line card and a third line card. The chassis defines a set of horizontal slots and a set of vertical slots. The first line card is disposed within a horizontal slot from the set of horizontal slots and has multiple ports. The first line card is associated with a first stage and a third stage of a multi-stage switch. The second line card is disposed within a first vertical slot from the set of vertical slots and has multiple ports. The third line card is disposed within a second vertical slot from the plurality of vertical slots, the third line card having a plurality of ports, the second line card and the third line card being associated with a second stage of the multi-stage switch. A first port from the multiple ports of the first line card is operatively coupled to a port from the multiple ports of the second line card via a first cable and a second port from the multiple ports of the first line card is operatively coupled to a port from the multiple ports of the third line card via a second cable.

Disposing the first line card perpendicular to the second line card and the third line card simplifies the cabling, as described in further detail herein. In some embodiments, for example, the cables operatively coupling the line cards can be shorter because of the perpendicular relationship between the line cards. In some embodiments, the first port from the multiple ports of the first line card can be substantially aligned with a port from the second line card to which the first port from the multiple ports of the first line card is coupled. Additionally, in such embodiments, the second port from the multiple ports of the first line card can be substantially aligned with a port from the third line card to which the second port from the multiple ports of the first line card is coupled. This alignment further simplifies the cabling by reducing and/or eliminating the number of cables that are crossed when the system is fully connected.

In some embodiments, an apparatus includes a chassis and a set of line cards. The chassis has a first portion defining a set of horizontal slots and a second portion defining a set of vertical slots. The first portion and the second portion are mutually exclusive. The set of line cards are associated with a multi-stage switch having a first configuration and a second configuration. A first line card from the set of line cards includes multiple ports, is associated with a first stage and a final stage of the multi-stage switch, and is disposed within a horizontal slot from the set of horizontal slots when the multi-stage switch is in the first configuration and the second configuration. A second line card from the set of line cards is disposed within a first vertical slot from the set of vertical slots and a third line card from the set of line cards is disposed within a second vertical slot from the set of vertical slots when the multi-stage switch is in the first configuration and the second configuration. The second line card and the third line card are associated with a second stage of the multi-stage switch. A fourth line card from the set of line cards being disposed within a third vertical slot from the set of vertical slots and a fifth line card from the set of line cards being disposed within a fourth vertical slot from the set of vertical slots when the multi-stage switch is in the second configuration. The fourth line card and the fifth line card are associated with a second stage of the multi-stage switch. A first set of ports from the multiple ports are operatively coupled to the second line card and a second set of ports from the multiple ports are operatively coupled to the third line card via a set of cables when the multi-stage switch is in the first configuration. A first subset of ports from the first set of ports is operatively coupled to the second line card, a first subset of ports from the second set of ports is operatively coupled to the third line card, a second subset of ports from the first set of ports is operatively coupled to the fourth line card and a second subset of ports from the second set of ports is operatively coupled to the fifth line card when the multi-stage switch is in the second configuration.

As used herein, a switch fabric system can be a system that includes a switch fabric and devices coupled to the switch fabric. In some embodiments, for example, a switch fabric system can include multiple input/output modules (e.g., an edge device, an access switch, etc.) operatively coupled to the switch fabric such that the input/output modules can send data to and receive data from the switch fabric. Additionally, in some embodiments, the switch fabric system can include peripheral devices (e.g., servers, storage devices, gateways, workstations, etc.) operatively coupled to the input/output modules such that the peripheral devices can send data to and receive data from the switch fabric via the input/output modules. In such embodiments, for example, a first peripheral device can send data to a second peripheral device via the input/output modules and the switch fabric, as described in further detail herein.

As used herein, a switch fabric can be a network that includes multiple stages of switches that operatively connect one or more input devices (e.g., a first edge device) with one or more output devices (e.g., a second edge device). A switch fabric can be configured to receive a signal from an input device, forward the signal through the multiple stages of switches, and output the signal to an output device. Each switch of the multiple stages of switches routes the signal such that the signal arrives at its destination. Such a switch fabric can be referred to, for example, as a Clos network.

As used herein, a module that is within a switch fabric can be any assembly and/or set of operatively coupled electrical components that defines one or more switches within a stage of a switch fabric. An input/output module (e.g., an edge device, an access switch, etc.) can be any assembly and/or set of operatively coupled electrical components configured to send data to and/or receive data from a switch fabric. In some embodiments, for example, an input/output module can be an access switch or an edge device configured receive data from a server, prepare data to enter into the switch fabric, and send the data to the switch fabric. In some embodiments, a module can include, for example, a memory, a processor, electrical traces, optical connectors, and/or the like.

As used in this specification, the singular forms "a," "an" and "the" include plural referents unless the context clearly dictates otherwise. Thus, for example, the term "a module" is intended to mean a single module or a combination of modules.

The terms "first stage", "second stage" and so on refer to portions, modules or nodes within a switch fabric. In some instances, these terms refer to a specific stage within a given switch fabric. For example, a three-stage Clos network includes three consecutive stages from ingress to egress; such a switch fabric has three stages that can be referred to as the "first stage" (the first stage with respect to the ingress to egress direction) through the "third stage" (the third and final stage with respect to the ingress to egress direction). For example, FIGS. 1-9 refer to specific stages within a given switch fabric. In other instances, however, the terms "first stage", "second stage" and so on refer to any stage within the stage fabric and correspond to the order of discussion of a given stage. For example, the "first stage" can refer to the first stage discussed and can correspond to any stage within the switch fabric (e.g., the third stage within a three-stage Clos network), and the "second stage" can refer to a remaining stage within the switch fabric (e.g., the second stage within the three-stage Clos network). Thus, it should be understood that the specific context will indicate whether the terms "first stage", "second stage" and so on can refer to a specific ordinal stage within a switch fabric or can refer to any particular stage within the switch fabric.

FIG. 1 is a schematic illustration of a switch fabric 100, according to an embodiment. Switch fabric 100 is a three-stage, non-blocking Clos network and includes a first stage 140, a second stage 142, and a third stage 144. The first stage 140 includes modules 112. Each module 112 of the first stage 140 is an assembly of electronic components and circuitry. In some embodiments, for example, each module is an application-specific integrated circuit (ASIC). In other embodiments, multiple modules are contained on a single ASIC or a single chip package. In still other embodiments, each module is an assembly of discrete electrical components.

In some embodiments, each module 112 of the first stage 140 is a switch (e.g., a packet switch, a frame switch and/or a cell switch). The switches are configured to redirect data (e.g., data packets, data cells, etc.) as it flows through the switch fabric 100. In some embodiments, for example, each switch includes multiple input ports operatively coupled to write interfaces on a memory buffer (not shown in FIG. 1). Similarly, a set of output ports are operatively coupled to read interfaces on the memory buffer. In some embodiments, the memory buffer can be a shared memory buffer implemented using on-chip static random access memory (SRAM) to provide sufficient bandwidth for all input ports to write one incoming cell (e.g., a portion of a data packet) or data packet per time period (e.g., one or more clock cycles) and all output ports to read one outgoing cell or data packet per time period. Each switch operates similar to a crossbar switch that can be reconfigured subsequent each time period.

In alternate embodiments, each module of the first stage is a crossbar switch having input bars and output bars. Multiple switches within the crossbar switch connect each input bar with each output bar. When a switch within the crossbar switch is in an "on" position, the input is operatively coupled to the output and data can flow. Alternatively, when a switch within the crossbar switch is in an "off" position, the input is not operatively coupled to the output and data cannot flow. Thus, the switches within the crossbar switch control which input bars are operatively coupled to which output bars.

Each module 112 of the first stage 140 includes a set of input ports 160 configured to receive data (e.g., a signal, a cell of a packet, a data packet, etc.) as it enters the switch fabric 100. In this embodiment, each module 112 of the first stage 140 includes the same number of input ports 160.

Similar to the first stage 140, the second stage 142 of the switch fabric 100 includes modules 114. The modules 114 of the second stage 142 are structurally similar to the modules 112 of the first stage 140. Each module 114 of the second stage 142 is operatively coupled to each module 112 of the first stage 140 by a data path 120. Each data path 120 between a given module 112 of the first stage 140 and a given module 114 of the second stage 142 is configured to facilitate data transfer from the modules 112 of the first stage 140 to the modules 114 of the second stage 142.

The data paths 120 between the modules 112 of the first stage 140 and the modules 114 of the second stage 142 can be constructed in any manner configured to facilitate data transfer from the modules 112 of the first stage 140 to the modules 114 of the second stage 142. In some embodiments, for example, the data paths 120 are optical or electrical connectors (e.g., cables) between the modules. In other embodiments, the data paths are within a midplane. Such a midplane can be similar to that described in U.S. application Ser. No. 12/345,500, filed Dec. 29, 2008, and entitled "System Architecture for a Scalable and Distributed Multi-Stage Switch Fabric," which is incorporated herein by reference in its entirety. Such a midplane can be used to connect each module of the second stage with each module of the first stage. In still other embodiments, two or more modules are contained within a single chip package and the data paths are electrical traces.

In some embodiments, the switch fabric 100 is a non-blocking Clos network. Thus, the number of modules 114 of the second stage 142 of the switch fabric 100 varies based on the number of input ports 160 of each module 112 of the first stage 140. In a rearrangeably non-blocking Clos network (e.g., a Benes network), the number of modules 114 of the second stage 142 is greater than or equal to the number of input ports 160 of each module 112 of the first stage 140. Thus, if n is the number of input ports 160 of each module 112 of the first stage 140 and m is the number of modules 114 of the second stage 142, $m \geq n$. In some embodiments, for example, each module of the first stage has five input ports. Thus, the second stage has at least five modules. All five modules of the first stage are operatively coupled to all five modules of the second stage by data paths. Said another way, each module of the first stage can send data to any module of the second stage.

The third stage 144 of the switch fabric 100 includes modules 116. The modules 116 of the third stage 144 are structurally similar to the modules 112 of the first stage 140. The number of modules 116 of the third stage 144 is typically equivalent to the number of modules 112 of the first stage 140. Each module 116 of the third stage 144 includes output ports 162 configured to allow data to exit the switch fabric 100. Each module 116 of the third stage 144 includes the same number of output ports 162. Further, the number of output ports 162 of each module 116 of the third stage 144 is typically equivalent to the number of input ports 160 of each module 112 of the first stage 140.

Each module 116 of the third stage 144 is connected to each module 114 of the second stage 142 by a data path 124. The data paths 124 between the modules 114 of the second stage 142 and the modules 116 of the third stage 144 are configured to facilitate data transfer from the modules 114 of the second stage 142 to the modules 116 of the third stage 144.

The data paths 124 between the modules 114 of the second stage 142 and the modules 116 of the third stage 144 can be constructed in any manner configured to facilitate data transfer from the modules 114 of the second stage 142 to the modules 116 of the third stage 144. In some embodiments, for example, the data paths 124 are optical or electrical connectors (e.g., cables) between the modules. In other embodiments, the data paths are within a midplane. Such a midplane can be used to connect each module of the second stage with each module of the third stage. In still other embodiments, two or more modules are contained within a single chip package and the data paths are electrical traces.

Figure 2:
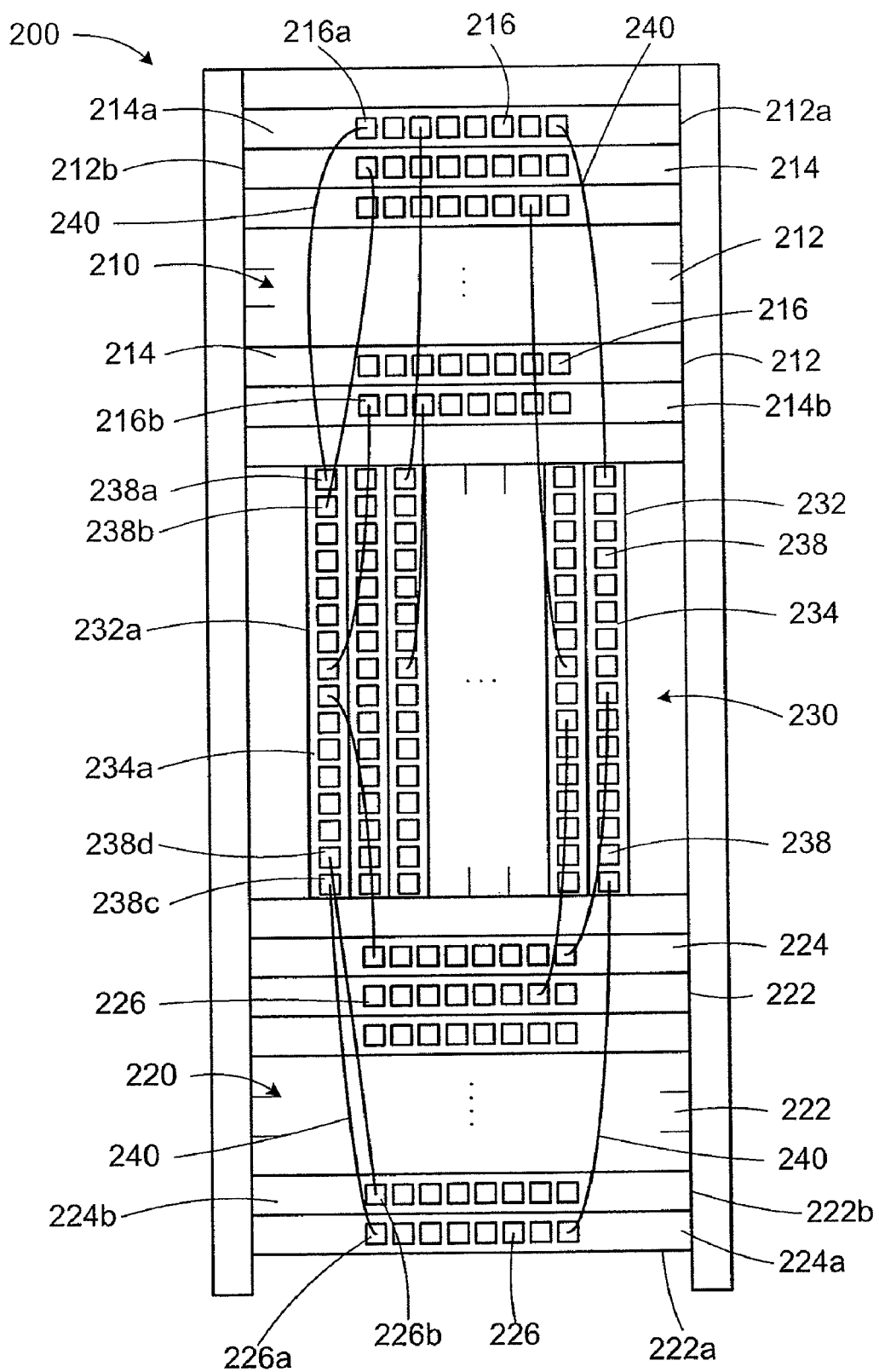
FIGS. 2 and 3 show a rear view and a front view of a chassis housing a switch fabric, respectively, according to another embodiment.
Figure 3:
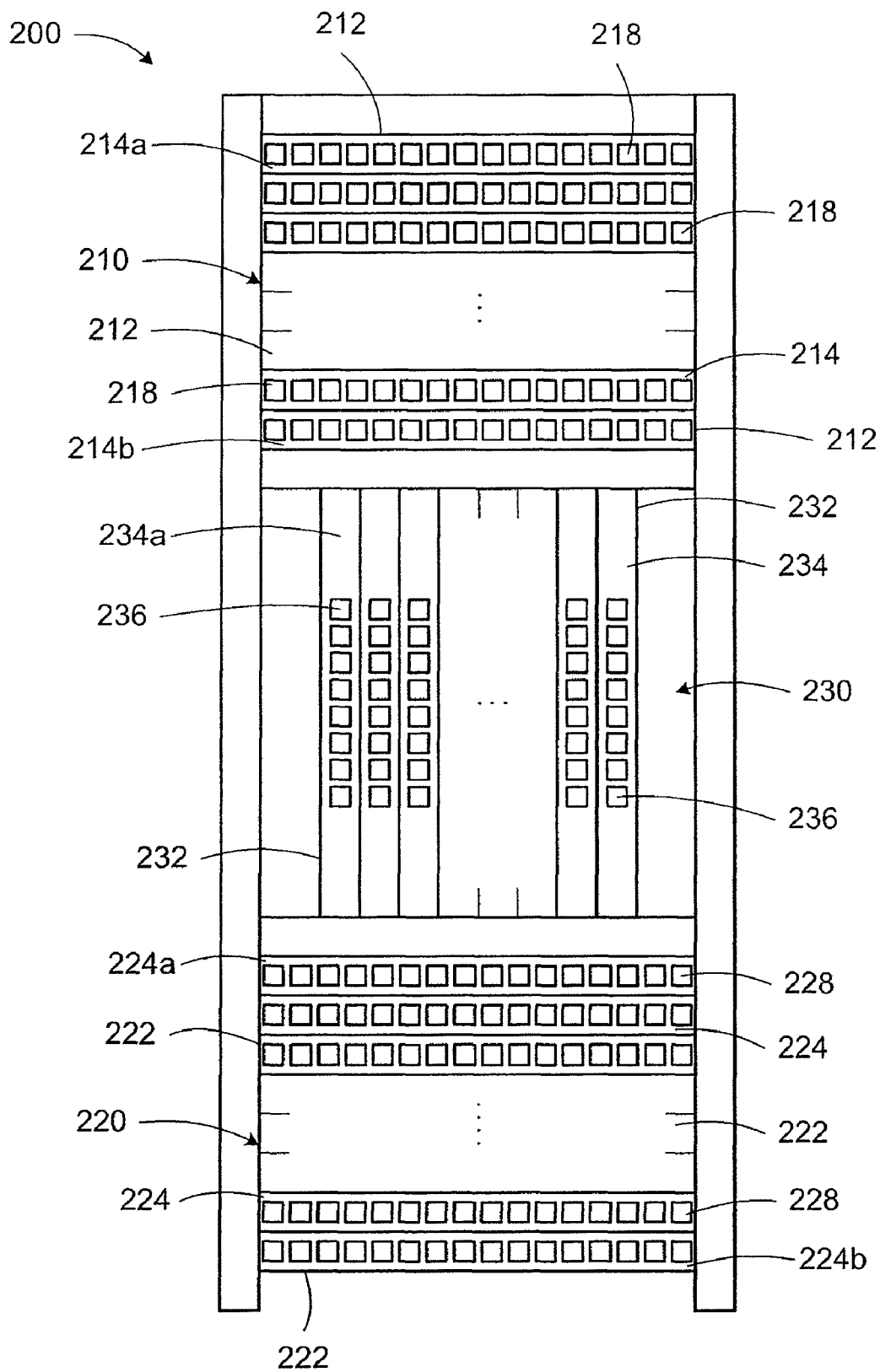

FIGS. 2 and 3 show a rear view and a front view of a chassis 200, respectively, according to another embodiment. The chassis 200 houses a switch fabric, functionally similar to the switch fabric 100 shown and described above in relation to FIG. 1. The chassis 200 includes a first portion 210, a second portion 220 and a third portion 230. The third portion 230 is disposed between the first portion 210 and the second portion 220.

The first portion 210 of the chassis 200 defines multiple slots 212. Each slot 212 is configured to receive and hold a line card 214 in a horizontal configuration. The slots 212 can be any suitable size. In some embodiments, for example, each slot is 1 rack unit (1U). In other embodiments, the slots have a size of greater than 1U (e.g., 2U, 4U, etc.). In still other embodiments, each slot has a size of less than 1U.

The line cards 214 are sized to fit into the slots 212. As such, the line cards 214 have a width substantially similar to a width of the chassis 200 (e.g., distance between the front (FIG. 3) to the back (FIG. 2) of the chassis 200). In some embodiments, each line card 214 is a 1U line card. In other embodiments, each line card has a size greater than 1U (e.g., 2U, 4U, etc.). In still other embodiments, each line card has a size of less than 1U.

Each line card 214 includes multiple front ports 218 (FIG. 3), multiple rear ports 216 (FIG. 2) and at least one switching module (not shown in FIGS. 2 and 3) associated with a first stage and a third stage of the switch fabric. The front ports 218 can be any suitable ports configured to operatively couple the line cards 214 to edge devices (not shown in FIGS. 2 and 3). In some embodiments the front ports 218 can be optical or electrical interface sockets such as, for example, small form-factor pluggable (SFP, SFP+, etc.) transceivers, quad small form-factor pluggable (QSFP) transceivers, CXP transceivers and/or the like. The edge devices to which the front ports 218 are coupled are configured to couple peripheral devices to the switch fabric, as described in further detail herein. Such peripheral devices can be, for example, servers, storage devices, gateways, workstations, and/or the like.

The rear ports 216 are configured to be coupled to the rear ports 238 of the line cards 234 associated with a second stage of the switch fabric, as described in further detail herein. The rear ports 216 are structurally similar to the front ports 218. As such, the rear ports 216 can be optical or electrical interface sockets such as, for example, small form-factor pluggable (SFP, SFP+, etc.) transceivers, quad small form-factor pluggable (QSFP) transceivers, CXP transceivers and/or the like. While shown in FIGS. 2 and 3 as having sixteen front ports 218 and eight rear ports 216, in other embodiments, each line card 214 can have any suitable number of front ports and/or rear ports.

The second portion 220 of the chassis 200 is structurally and functionally similar to the first portion 210. As such, the second portion 220 defines multiple slots 222, each configured to receive and hold a line card 224 in a horizontal configuration. As such, each line card 224 is configured to be disposed within the chassis 200 such that it is positioned substantially parallel to the line cards 214.

The line cards 224 are structurally and functionally similar to the line cards 214. As such, each line card includes multiple front ports 228 (FIG. 3) configured to operatively couple the line card 224 with an edge device, multiple rear ports 226 (FIG. 2) configured to operatively couple the line card 224 with a line card associated with the second stage of the switch fabric, and at least one module associated with the first stage and the third stage of the switch fabric.

The third portion 230 of the chassis 200 defines multiple slots 232. Each slot 232 is configured to receive and hold a line card 234 in a vertical configuration. As such, each line card 234 is configured to be disposed within the chassis 200 such that it is positioned substantially perpendicular to the line cards 214 and the line cards 224. Similarly stated, a longitudinal axis defined by each slot 232 defines a substantially right angle with a longitudinal axis defined by each slot 212 and 222.

The slots 232 can be any suitable size. In some embodiments, for example, each slot is 1 rack unit (1U). In other embodiments, the slots have a size of greater than 1U (e.g., 2U, 4U, etc.). In still other embodiments, each slot has a size of less than 1U. In some embodiments, each slot 232 defines a volume substantially similar to a volume defined by the slots 212 and/or the slots 222.

The line cards 234 are sized to fit into the slots 232. As such, the line cards 234 have a width substantially similar to a width of the chassis 200 (e.g., distance between the front (FIG. 3) to the back (FIG. 2) of the chassis 200). In some embodiments, each line card 234 is a 1U line card. In other embodiments, each line card has a size greater than 1U (e.g., 2U, 4U, etc.). In still other embodiments, each line card has a size of less than 1U.

Each line card 234 includes multiple front ports 236 (FIG. 3), multiple rear ports 238 (FIG. 2) and at least one switching module (not shown in FIGS. 2 and 3) associated with a second stage of the switch fabric. The rear ports 238 can be any suitable ports configured to operatively couple the line cards 234 to the rear ports 216 of the line cards 214 and the rear ports 226 of the line cards 224 associated with the first stage and the third stage of the switch fabric. In some embodiments the rear ports 238 can be optical or electrical interface sockets such as, for example, small form-factor pluggable (SFP, SFP+, etc.) transceivers, quad small form-factor pluggable (QSFP) transceivers, CXP transceivers and/or the like.

The front ports 236 can be structurally similar to the rear ports 216 of the line cards 214 or the rear ports 226 of the line cards 224. In some embodiments, the front ports 236 are left uncoupled as they are unnecessary for operation. Having a line card 234 with multiple front ports 236 allows multiple instances of a single line card to be used for the line cards 214, the line cards 224 and the line cards 234, as described in further detail herein. In other embodiments, the line cards 234 do not include front ports.

The rear ports 216, 226 of the line cards 214 and the line cards 224 are configured to be coupled to the rear ports 238 of the line cards 234 using optical and/or electrical cables 240. In some embodiments, for example, the cables 240 can be passive twinaxial copper cables, active twinaxial copper cables having electronic signal repeaters, optical fibers and/or the like. For clarity, FIG. 2 does not show all of the cables 240 between the line cards 214, 224 and the line cards 234.

Each line card 214, 224 is coupled to each line card 234 (again, FIG. 2 shows some cables 240 for clarity, but it should be understood that more cables are present such that each line card 214, 224 is coupled to each line card 234). Additionally, because each line card 214, 224 includes eight rear ports 216, 226 and eight line cards 234 are disposed within the middle portion 230 of the chassis 200, each rear port 216 of a line card 214 is operatively coupled to a different line card 234 and each rear port 226 of a line card 224 is operatively coupled to a different line card 234. The perpendicular relationship of the line cards 214, 224 to the line cards 234 simplifies the cabling, as described in further detail herein.

As shown in FIG. 2, a first port 216a of a line card 214a disposed in a first slot 212a (e.g., a top most slot) of the first portion 210 is operatively coupled to a first port 238a of a line card 234a disposed in a first slot 232a of the third portion 230. Similarly, the first port 216b of a line card 214b disposed in a second slot 212b (e.g., the second to the top most slot) is operatively coupled to a second port 238b of the line card 234a disposed in the first slot 232a. The first ports of the other line cards 214 (e.g., the other six line cards 214) are coupled to the line card 234a disposed in the first slot 232a in a similar manner. This takes up eight of the sixteen ports 238 on the line card 234a.

A first port 226a of a line card 224a disposed in a first slot 222a (e.g., the bottom most slot) of the second portion 220 is operatively coupled to a sixteenth port 238c of the line card 234a disposed in the first slot 232a of the third portion 230. Similarly, the first port 226b of a line card 224b disposed in a second slot 222b (e.g., the second to the bottom most slot) is operatively coupled to a fifteenth port 238d of the line card 234a disposed in the first slot 232a. The first ports of the other line cards 224 (e.g., the other six line cards 224) are coupled to the line card 234a disposed in the first slot 232a in a similar manner. Accordingly, the first port 216 of the eight line cards 214 in the first portion 210 and the first port 226 of the eight line cards 224 in the second portion 220 are operatively coupled to one of the sixteen rear ports 238 of the line card 234a disposed in the first slot 232a.

The second port 216, 226 of each line card 214, 224 through the eighth port 216, 226 of each line card 214, 216 are operatively coupled to the second line card 234 to the eighth line card 234, respectively. This configuration simplifies the cabling by reducing the number of cables 240 that are crossed when being coupled between the line cards 214, 224 and the line cards 234. This configuration also reduces the length of the cables 240 used to couple the line cards 214, 224 to the line cards 234.

In use, data is transferred from a first edge device (not shown in FIGS. 2 and 3) to a second edge device (not shown in FIGS. 2 and 3) via the switch fabric. The first edge device sends data to a switching module associated with the first stage of the switch fabric on a line card 214 or 224 via a front port 218 or 228. The switching module associated with the first stage forwards the data to a switching module associated with a second stage of the switch fabric on a line card 234 via a cable 240.

The switching module associated with the second stage determines how to send the data using, for example, a routing table and accordingly redirects the data to a line card 214 or 224 via a cable 240. Because each line card 234 is operatively coupled to each line card 214 and 224, the switching module associated with the second stage can use a routing table to ensure that the data is sent to a switching module associated with the third stage on a line card 214, 224 that is operatively coupled to the second edge device. The data is sent to a switching module associated with the third stage on a line card 214, 224. The switching module associated with the third stage then sends the data to the second edge device through a front port 218, 228.

In some embodiments, the first edge device separates the data into separate portions (e.g., cells) and the switching module associated with the first stage forwards a portion of the data to various switching modules associated with the second stage to which the switching module associated with the first stage is operatively coupled. Each switching module associated with the second stage then determines how to send the portions of the data using, for example, a routing table and redirects the portions of the data back to a single switching module associated with the third stage. The received portions of the data are sent to the second edge device. The second edge device can then reconstruct the data from the received portions.

Figure 4:
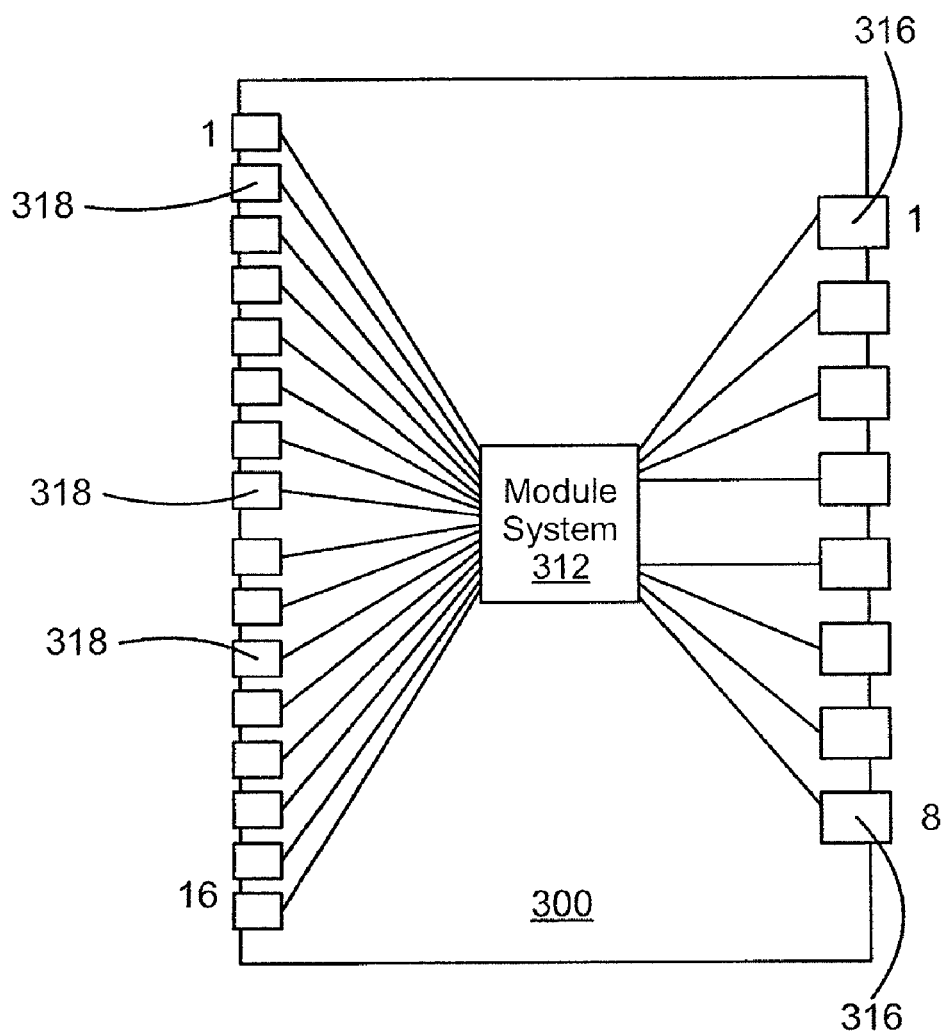
FIG. 4 is a schematic illustration of a line card, according to another embodiment.

FIG. 4 is a schematic illustration of a line card 300, according to another embodiment. The line card 300 includes a first set of ports 318, a second set of ports 316, and a module system 312. In some embodiments, instances of the line card 300 can be used as the line cards 214, the line cards 224 and the line cards 234, shown and described with respect to FIGS. 2 and 3. Using multiple instances of a single line card 300 reduces the costs and allows a user to easily reconfigure the system as needed.

The first set of ports 318 includes sixteen ports 318. Each port 318 from the first set of ports 318 can be any suitable port configured to receive a cable. In some embodiments the ports 318 can be optical or electrical interface sockets such as, for example, small form-factor pluggable (SFP, SFP+, etc.) transceivers, quad small form-factor pluggable (QSFP) transceivers, CXP transceivers and/or the like. The second set of ports 316 includes eight ports 316. Each port 316 from the second set of ports 316 can be structurally similar to the ports 318 from the first set of ports 318. While shown in FIG. 4 as having sixteen and eight ports respectively, in other embodiments, the first set of ports and/or the second set of ports can include any number of ports.

Figure 5:
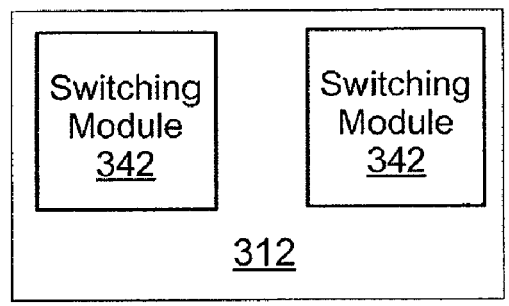
FIG. 5 is a schematic illustration of a module system of the line card shown in FIG. 4.

FIG. 5 shows the module system 312 of the line card 300 in greater detail. The module system 312 includes switching modules 342 that route data through the switch fabric. The switching modules 342 can be associated with a first stage of the switch fabric, associated with the second stage of the switch fabric or associated with the third stage of the switch fabric, depending on the configuration of the line card 300 within the system. For example, if the line card 300 is used as a line card 214 or a line card 224 as shown and described with respect to FIGS. 2 and 3, the switching modules 342 can be associated with the first stage and the third stage of the switch fabric (e.g., one switching module 342 can be associated with the first stage and one switch module 342 can be associated with the third stage). If the line card 300 is used as a line card 234, the switching modules 342 can be associated with the second stage of the switch fabric.

As shown in FIG. 4, the module system 312 is operatively coupled to each of the ports 318 from first set of ports 318 and each of the ports 316 from the second set of ports 316. This allows the module system 312 to receive data from and/or send data to any of the modules and/or devices operatively coupled to the ports 318, 316. For example, if the line card 300 is used as a line card 214 or a line card 224, each of the ports 318 can be similar to the front ports 218 (FIG. 3) and can thus be operatively coupled to an edge device via a cable. Further, each of the ports 316 can be similar to the rear ports 216 (FIG. 2) and can thus be operatively coupled to a line card 234 associated with the second stage of the switch fabric. Similarly, if the line card 300 is used as a line card 234, each of the ports 318 can be similar to the rear ports 218 (FIG. 2) and can thus be operatively coupled to a line card 214 or a line card 224. Further, each of the ports 318 can be similar to the front ports 216 (FIG. 3).

As shown in FIGS. 2 and 3, when using multiple instances of the line card 300 for the line cards 214, 224 and 234, the line cards 214 and 224 are positioned within the chassis 200 in a different orientation as the line cards 234. For example, when the line card 300 is used as a line card 214 or 224, the line card 300 is horizontally positioned within the chassis 200 such that the ports 318 of the line card 300 face forward (FIG. 3). Further, when the line card 300 is used as a line card 234, the line card is vertically positioned within the chassis 200 such that the ports 318 of the line card 300 face rearward. Using such positioning, multiple instances of a single line card 300 can be used for the line cards 214, 224, and 234.

Figure 6:
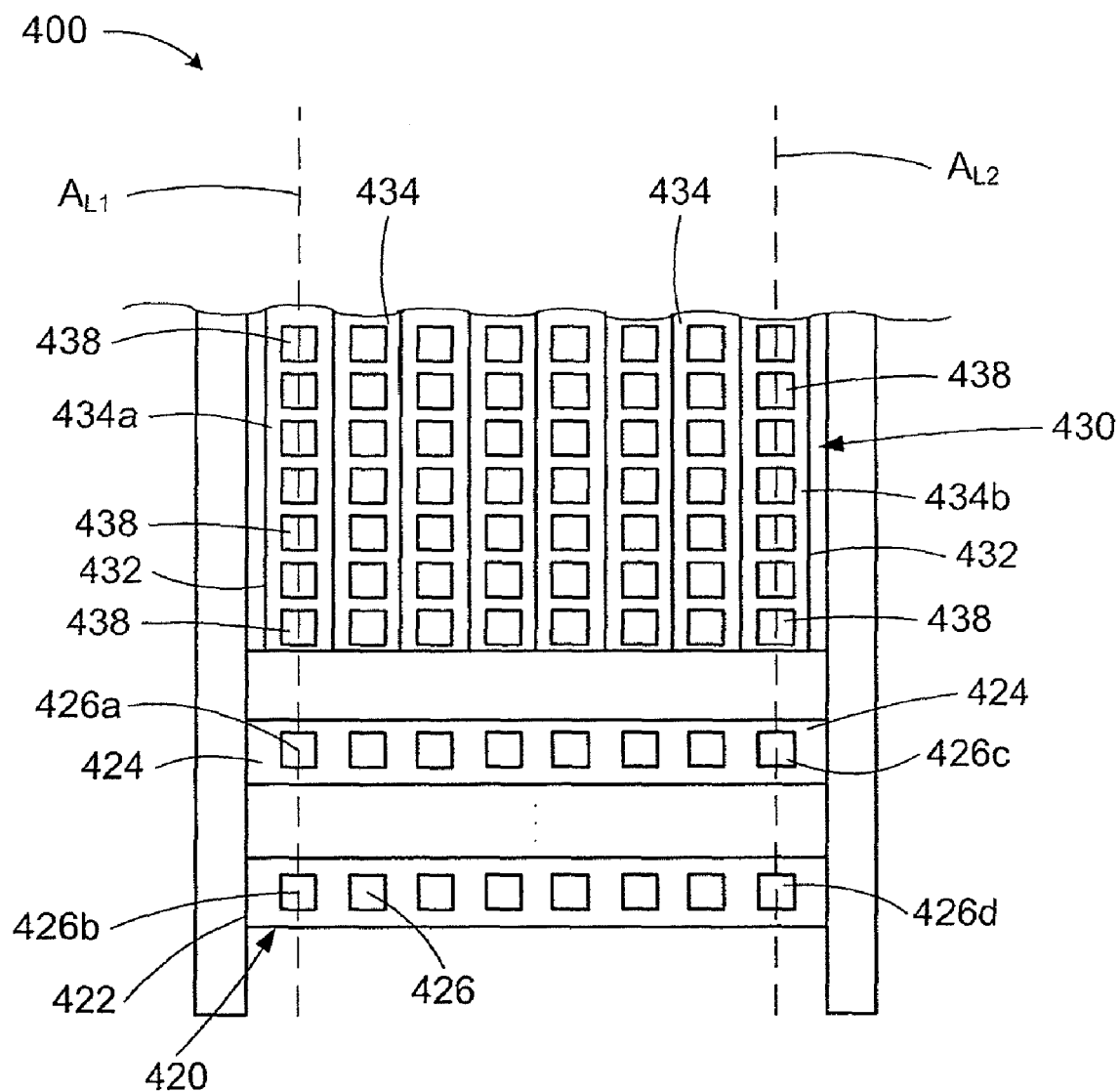
FIG. 6 is a rear view of a portion of a chassis housing a switch fabric, according to another embodiment.

FIG. 6 is a rear view of a portion of a chassis 400 housing a set of line cards, according to another embodiment. The chassis 400 includes a first portion 420 and a second portion 430. The first portion 420 is similar to the second portion 220 shown and described with respect to FIGS. 2 and 3. As such, the first portion 420 defines multiple slots 422, each configured to receive and hold a line card 424 in a horizontal configuration (while the first portion 420 can include any number of slots 422, for clarity, only two slots 422 holding line cards 424 are shown in FIG. 6). The second portion 430 is similar to the third portion 230 shown and described above with respect to FIGS. 2 and 3. As such, the second portion 430 defines multiple slots 432, each configured to receive and hold a line card 434 in a vertical configuration.

The line cards 424 and the line cards 434 are structurally and functionally similar to the line cards 224 and 234, respectively. Accordingly, the line cards 424 include ports 426 and the line cards 434 include ports 438. The ports 426 are configured to be operatively coupled to the ports 438 via cables.

Each of the line cards 434 define a vertical axis. As shown in FIG. 6, for example, line card 434a defines a first vertical axis $A_{L1}$ and line card 434b defines a second vertical axis $A_{L2}$. Each of the ports 426 on the line cards 424 are spaced such that the ports 426 are substantially aligned along a vertical axis defined by a line card 424. For example, the ports 426a and 426b are positioned such that they are substantially aligned with the first vertical axis $A_{L1}$. Because the ports 426a and 426b are so aligned, they can be easily coupled to the ports 438 on the line card 434a. Similarly, the ports 426c and 426d are positioned such that they are substantially aligned with the second vertical axis $A_{L2}$. Because the ports 426c and 426d are so aligned, they can be easily coupled to the ports 438 on the line card 434b. Substantially aligning the ports 426 with one of the vertical axes decreases the complexity and the cable length needed to operatively couple the ports 426 to the ports 438.

Figure 7:
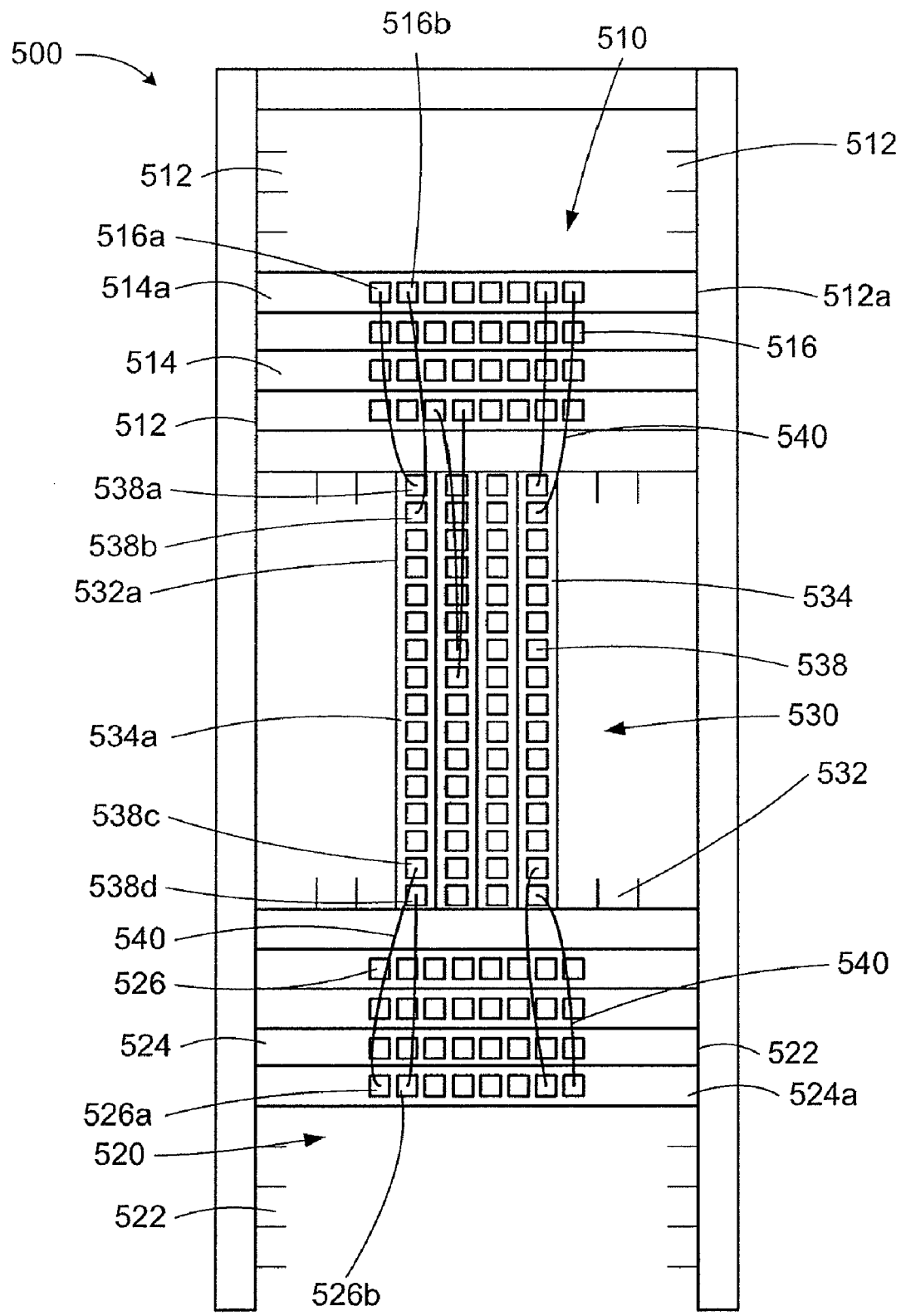
FIG. 7 is a rear view of a chassis housing a switch fabric, according to another embodiment.

FIG. 7 is a rear view of a chassis 500 housing a set of line cards, according to another embodiment. The chassis 500 is structurally similar to the chassis 200. As such, the chassis 500 is configured to house a switch fabric functionally similar to the switch fabric 100, shown and described above in relation to FIG. 1. The switch fabric housed by the chassis 500 is in a configuration smaller than the switch fabric 200 shown and described above with respect to FIGS. 2 and 3. The switch fabric 500 can be easily upgraded from the configuration shown in FIG. 7 to the configuration shown in FIGS. 2 and 3, as described in further detail herein. Similarly, the switch fabric 200 can be easily downgraded from the configuration shown in FIGS. 2 and 3 to the configuration shown in FIG. 7.

The chassis 500 includes a first portion 510, a second portion 520, and a third portion 530 disposed between the first portion 510 and the second portion 520. The first portion 510 of the chassis 500 defines multiple slots 512. Each slot 512 is configured to receive and hold a line card 514 in a horizontal configuration. Similarly, the second portion 520 of the chassis 500 defines multiple slots 522. Each slot 522 is configured to receive and hold a line card 524 in a horizontal configuration. Accordingly, the line cards 514 are configured to be disposed substantially parallel to the line cards 524 when disposed within the chassis 500. While shown in FIG. 7 as each having eight slots 512, 522, in other embodiments, the first portion and/or the second portion can have any number of slots.

The third portion 530 of the chassis defines multiple slots 532. Each slot 532 is configured to receive and hold a line card 534 in a vertical configuration. Accordingly, the line cards 534 are configured to be disposed substantially perpendicular to the line cards 514 and the line cards 524 when disposed within the chassis 500. Similarly stated, a longitudinal axis defined by each slot 532 is substantially perpendicular to a longitudinal axis defined by each slot 512 and 522. While shown in FIG. 7 as having eight slots 532, in other embodiments, the third portion 530 can have any number of slots.

The line cards 514, 524 and 534 are substantially similar to the line cards 214, 224 and 234, shown and described above with respect to FIGS. 2 and 3 and are sized to fit into the slots 512, 522, and 532, respectively. Each line card 514, 524 includes multiple rear ports 516, 526, multiple front ports (not shown in FIG. 7), and at least one switching module (not shown in FIG. 7) associated with a first stage and a third stage of the switch fabric. The front ports can be any suitable ports configured to operatively couple the line cards 514 to edge devices (not shown in FIG. 7).

The rear ports 516, 526 are configured to be coupled to the rear ports 538 of the line cards 534 associated with a second stage of the switch fabric, as described in further detail herein. While shown in FIG. 7 as having eight rear ports 516, 526 in other embodiments, each line card 514, 524 can have any suitable number of front ports and/or rear ports.

Similarly, each line card 534 includes multiple front ports (not shown in FIG. 7), multiple rear ports 538 and at least one switching module (not shown in FIG. 7) associated with a second stage of the switch fabric. The rear ports 538 can be any suitable ports configured to operatively couple the line cards 534 to the rear ports 516 of the line cards 514 and the rear ports 526 of the line cards 524 associated with the first stage and the third stage of the switch fabric.

The front ports of each line card 534 can be structurally similar to the rear ports 516 of the line cards 514 or the rear ports 526 of the line cards 524. In some embodiments, the front ports are left uncoupled as they are unnecessary for operation. Having a line card 534 with multiple front ports allows multiple instances of a single line card to be used for the line cards 514, the line cards 524 and the line cards 534. In other embodiments, the line cards 534 do not include front ports.

The rear ports 516, 526 of the line cards 514 and the line cards 524 are configured to be coupled to the rear ports 538 of the line cards 534 using optical and/or electrical cables 540. In some embodiments, for example, the cables 540 can be passive twinaxial copper cables, active twinaxial copper cables having electronic signal repeaters, optical fibers and/or the like. For clarity, FIG. 7 does not show all of the cables 540 between the line cards 514, 524 and the line cards 534.

As shown in FIG. 7, each line card 514, 524 is coupled to each line card 534 (again, FIG. 7 shows some cables for clarity, but it should be understood that more cables 540 are present such that each line card 514, 524 is coupled to each line card 534). Because each line card 514, 524 includes eight rear ports 516, 526 and four line cards 534 are disposed within the middle portion 530 of the chassis 500, two rear ports 516 of each line card 514 are operatively coupled to each line card 534 and two rear ports 526 of a each line card 524 are operatively coupled to a different line card 534. The perpendicular relationship of the line cards 514, 524 to the line cards 534 simplifies the cabling, as described in further detail herein.

As shown in FIG. 7, a first port 516a of a line card 514a disposed in a first slot 512a (e.g., the top most filled slot) of the first portion 510 is operatively coupled to a first port 538a of a line card 534a disposed in a first slot 532a of the third portion 530. Similarly, the second port 516b of the line card 514a is operatively coupled to a second port 538b of the line card 534a disposed in the first slot 532a. The first and second ports of the other line cards 514 (e.g., the other three line cards 514) are coupled to the line card 534a disposed in the first slot 532a in a similar manner. This takes up eight of the sixteen ports 538 on the line card 534a.

A first port 526a of a line card 524a disposed in a first slot 522a (e.g., the bottom most filled slot) of the second portion 520 is operatively coupled to a fifteenth port 538c of the line card 534a disposed in the first slot 532a of the third portion 530. Similarly, the second port 526b of the line card 524b is operatively coupled to a sixteenth port 538d of the line card 534a disposed in the first slot 532a. The first and second ports 526 of the other line cards 524 (e.g., the other three line cards 524) are coupled to the line card 534a disposed in the first slot 532a in a similar manner. Accordingly, the first and second ports 516 of the four line cards 514 in the first portion 510, and the first port and second ports 526 of the four line cards 524 in the second portion 520, are operatively coupled to two of the sixteen rear ports 538 of the line card 534a disposed in the first slot 532a.

The third and fourth rear ports 516, 526, the fifth and sixth rear ports 516, 526, and the seventh and eighth rear ports 516, 526 of each line card 514, 524 are operatively coupled to the second line card 534, the third line card 534 and the fourth line card 534, respectively. This configuration simplifies the cabling by reducing the number of cables 540 that are crossed when being coupled between the line cards 514, 524 and the line cards 534. This configuration also reduces the length of the cables 240 used to couple the line cards 514, 524 to the line cards 534.

The configuration of the switch fabric within the chassis 500 shown and described with respect to FIG. 7 can be upgraded to the configuration of the switch fabric within the chassis 200 shown and described with respect to FIGS. 2 and 3. As shown in FIG. 7, the first portion 510 includes four slots 512 in which line cards 514 are not disposed. In upgrading the switch fabric to the configuration shown in FIGS. 2 and 3, a line card 514 is inserted into each empty slot 512. Similarly, the second portion 520 and the third portion 530 each include four slots 522, 532 in which line cards 524, 534 are not disposed. In upgrading the switch fabric to the configuration shown in FIGS. 2 and 3, a line card 524, 534 is inserted into the empty slots 522, 532. Thus, a total of eight line cards 514, 524, 534 are disposed within the slots 512, 522, 532 of each of the first portion 510, the second portion 520 and the third portion 530, respectively.

After the slots 512, 522, 532, of the chassis 500 are filled, the cables 540 can be reconfigured to resemble the cabling configuration shown in FIG. 2. After the cables 540 have been reconfigured, the switch fabric within the chassis 500 is in the configuration of the switch fabric within the chassis 200 shown and described with respect to FIGS. 2 and 3.

In some embodiments, the upgrade of the switch fabric from the configuration of FIG. 7 to the configuration of FIGS. 2 and 3 can occur while maintaining operation of the switch fabric. In such embodiments, reconfiguring the cables 540 occurs incrementally. For example, the cables 540 coupled to the line card 514a can be reconfigured while the other line cards 514, 524, 534 are in operation. Similarly, the line card 514a can be in operation (e.g., in the upgraded configuration (FIGS. 2 and 3) while the other cables 540 and line cards 524, 524, 534 are reconfigured. This allows for little to no downtime when upgrading the switch fabric.

Once in the configuration of FIGS. 2 and 3, the switch fabric can be operatively coupled to twice as many edge devices because the switch fabric includes twice as many line cards 214, 224. This allows a greater number of peripheral devices to be operatively coupled to the switch fabric. Accordingly, a greater number of peripheral devices can send data to each other across the switch fabric.

The configuration of the switch fabric within the chassis 200 (FIGS. 2 and 3) can similarly be downgraded to the configuration of the switch fabric within the chassis 500 (FIG. 7) depending on the requirements of the switch fabric. Thus, if the connectivity requirements of the switch fabric decreases, the switch fabric can be downgraded to include the optimal number of line cards. Additionally, the upgraded or downgraded switch fabric can use the same chassis as the original system. Thus, upgrading and/or downgrading the switch fabric can easily occur any number of time throughout the life of the switch fabric as the connectivity requirements of the switch fabric varies.

While shown in FIGS. 2, 3 and 7 as being upgradable between having four line cards 514, four line cards 524 and four line cards 534, and having eight line cards 214, eight line cards 224 and eight line cards 234, the switch fabric can be upgraded and/or downgraded to include any number of line cards depending on the connectivity requirements of the switch fabric. In some embodiments, for example, the switch fabric can include two line cards in each portion of the chassis. In other embodiments, the switch fabric can include sixteen line cards in each portion of the chassis.

Figure 8:
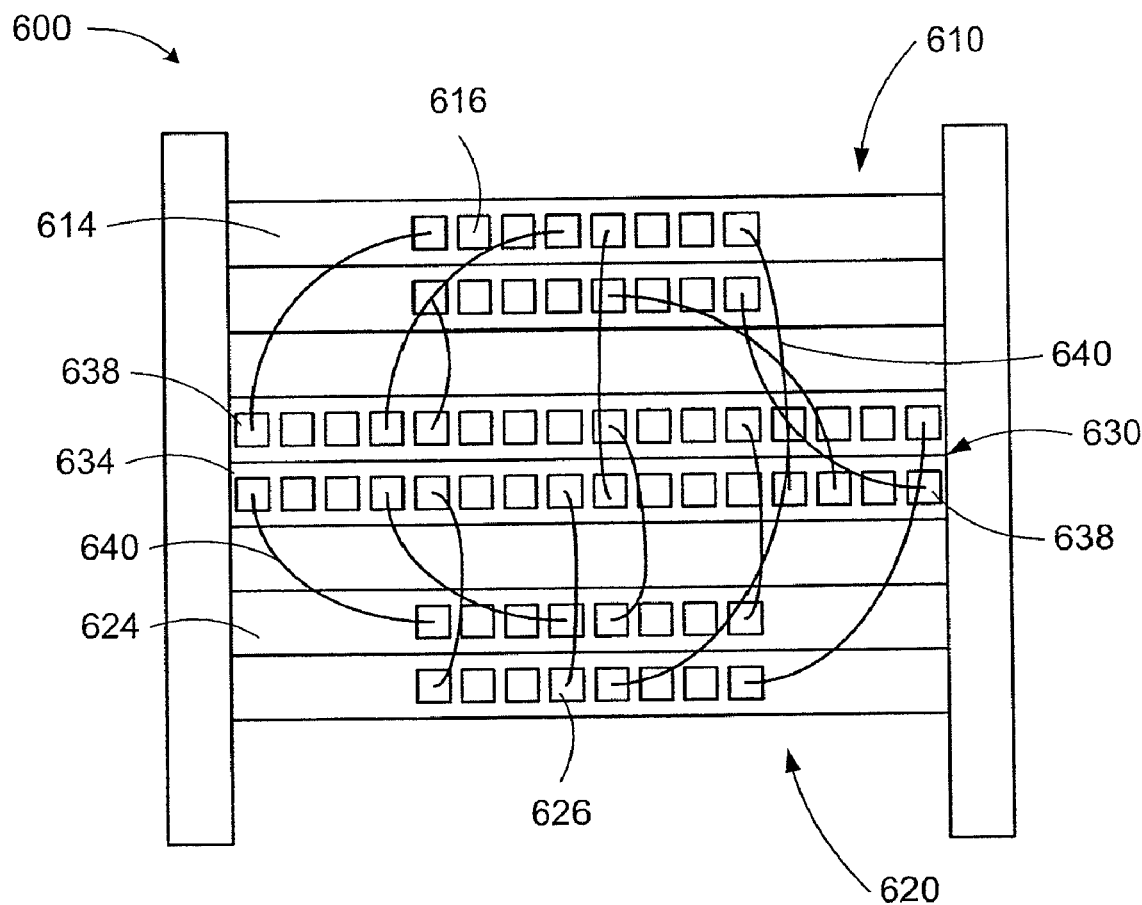
FIG. 8 is a rear view of a chassis housing a switch fabric, according to another embodiment.

FIG. 8 is a rear view of a chassis 600 housing a set of line cards, according to another embodiment. The chassis 600 includes a first portion 610 having multiple horizontal slots, a second portion 620 having multiple horizontal slots 620 and a third portion 630 having multiple horizontal slots. The chassis 600 is shown in FIG. 8 as having two line cards 614 disposed within the first portion 610, two line cards 624 disposed within the second portion 620 and two line cards 634 disposed within the third portion 630.

The line cards 614, 624 and 634 are substantially similar to the line cards 214, 224 and 234, shown and described above with respect to FIGS. 2 and 3. As such, each line card 614, 624, 634 includes multiple rear ports 616, 626, 638, multiple front ports (not shown in FIG. 8), and at least one switching module (not shown in FIG. 8) associated with a stage of the switch fabric.

As shown in FIG. 8, each line card 614, 624 is coupled to each line card 634. Because each line card 614, 624 includes eight rear ports 616, 626 and two line cards 634 are disposed within the middle portion 630 of the chassis 600, four rear ports 616, 626 of each line card 614, 624 are operatively coupled to each line card 634. For clarity, FIG. 8 does not show all of the cables 640 disposed between the line cards 614, 624 and the line cards 634. Similar to the other embodiments shown and described herein, the switch fabric within the chassis 600 can be upgraded and/or downgraded as needed by adding and/or removing line cards 614, 624,634 and cables 640 from the chassis 600.

Figure 9:
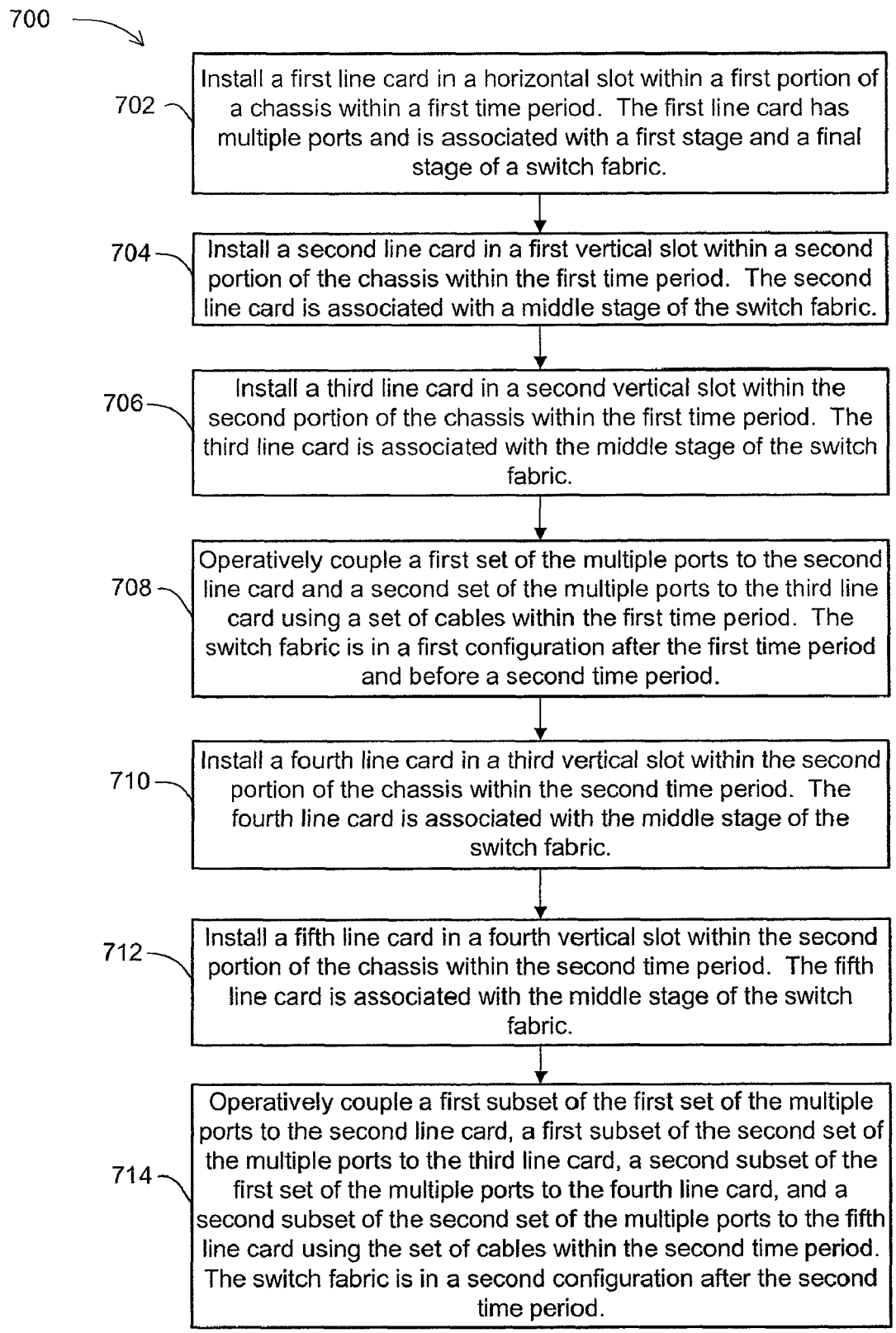
FIG. 9 is a flow chart illustrating a method of upgrading a switch fabric system, according to another embodiment.

FIG. 9 is a flow chart illustrating a method 700 of upgrading a switch fabric system, according to another embodiment. The method includes installing a first line card in a horizontal slot within a first portion of a chassis within a first time period, at 702. The first line card has multiple ports and is associated with a first stage and a final stage of a switch fabric. In some embodiments, the chassis can be similar to the chassis 200 shown and described with respect to FIGS. 2 and 3. Similarly, the first line card can be similar to the line card 300 shown and described with respect to FIGS. 4 and 5.

A second line card is installed in a first vertical slot within a second portion of the chassis within the first time period, at 704. The second line card is associated with a middle stage of the switch fabric. A third card is installed in a second vertical slot within the second portion of the chassis within the first time period, at 706. The third line card is associated with the middle stage of the switch fabric. In some embodiments, the second line card and the third line card are substantially similar to the first line card. In such embodiments, for example, the first line card, the second line card and the third line card can be multiple instances of a line card.

A first set of the multiple ports is operatively coupled to the second line card and a second set of the multiple ports is operatively coupled to the third line card using a set of cables within the first time period, at 708. The switch fabric is in a first configuration after the first time period and before the second time period.

A fourth line card is installed in a third vertical slot within the second portion of the chassis within the second time period, at 710. The fourth line card is associated with the middle stage of the switch fabric. A fifth line card is installed in a fourth vertical slot within the second portion of the chassis within the second time period, at 712. The fifth line card is associated with the middle stage of the switch fabric. In some embodiments, the fourth line card and the fifth line card are substantially similar to the first line card.

A first subset of the first set of the multiple ports is operatively coupled to the second line card, a first subset of the second set of the multiple ports is operatively coupled to the third line card, a second subset of the first set of the multiple ports is operatively coupled to the fourth line card, and a second subset of the second set of the multiple ports is operatively coupled to the fifth line card using the set of cables within the second time period, at 714. The switch fabric is in a second configuration after the second time period. In some embodiments, the switch fabric can maintain operation during the second time period.

In some embodiments, the second configuration can be an upgraded configuration from the first configuration. In such embodiments, additional edge devices can be operatively coupled to the switch fabric when in the second configuration. In some embodiments, the switch fabric can be downgraded from the second configuration to the first configuration as the connectivity requirements of the switch fabric are reduced.

While various embodiments have been described above, it should be understood that they have been presented by way of example only, and not limitation. Where methods described above indicate certain events occurring in certain order, the ordering of certain events may be modified. Additionally, certain of the events may be performed concurrently in a parallel process when possible, as well as performed sequentially as described above.

In some embodiments, the switch fabric can include more than a single chassis. In such embodiments, a first portion of the switch fabric can be disposed within a first chassis and a second portion of the switch fabric can be disposed within a second chassis. The line cards of the first portion can be operatively coupled to the line cards of the second portion in any suitable manner. For example, optical and/or electrical cables can be used to operatively couple the line cards of the first portion to the line cards of the second portion. In other embodiments, a wireless connection can be used to operatively couple the line cards.

While shown and described above as being a three-stage switch fabric, in other embodiments, the switch fabric can include any number of stages. In some embodiments, for example, the switch fabric can be a five stage switch fabric similar to the switch fabric shown and described in U.S. patent application Ser. No. 12/345,500, filed on Dec. 29, 2008, and entitled "System Architecture for a Scalable and Distributed Multi-Stage Switch Fabric," and co-pending U.S. patent application Ser. No. 12/345,502, filed on Dec. 29, 2008, and entitled "Methods and Apparatus Related to a Modular Switch Architecture," each of which is incorporated herein by reference in its entirety. Such a five stage switch fabric can be disposed within any number of chassis and can be upgraded and/or downgraded as needed.

In some embodiments, for example, a chassis housing a five-stage switch fabric can include five portions: two portions housing line cards associated with the first stage and the fifth stage of the switch fabric, two portions housing line cards associated with the second stage and the fourth stage of the switch fabric, and a portion housing line cards associated with the third stage of the switch fabric. Each portion of the chassis housing line cards associated with the second stage and the fourth stage can be disposed between one of the portions housing line cards associated with the first stage and the fifth stage and the portion housing line cards associated with the third stage. To simplify the cabling, the portions housing the line cards associated with the first stage and the fifth stage and the portion housing the line cards associated with the third stage of can be disposed in horizontal slots within the chassis while the line cards associated with the second stage and the fourth stage can be disposed within vertical slots within the switch fabric. In other embodiments, the switch fabric can include any other number of stages such as seven, nine or eleven stages.

Some embodiments described herein relate to a computer storage product with a computer- or processor-readable medium (also can be referred to as a processor-readable medium) having instructions or computer code thereon for performing various computer-implemented operations. The media and computer code (also can be referred to as code) may be those designed and constructed for the specific purpose or purposes. Examples of computer-readable media include, but are not limited to: magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as general purpose microprocessors, microcontrollers, Application-Specific Integrated Circuits (ASICs), Programmable Logic Devices (PLDs), and Read-Only Memory (ROM) and Random-Access Memory (RAM) devices.

Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using Java, C++, or other programming languages (e.g., object-oriented programming languages) and development tools. Additional examples of computer code include, but are not limited to, control signals, encrypted code, and compressed code.

Although various embodiments have been described as having particular features and/or combinations of components, other embodiments are possible having a combination of any features and/or components from any of embodiments where appropriate. For example, any suitable number of line cards having any suitable number of ports can be disposed within a chassis. Such line cards can be coupled to each other in any suitable manner (e.g., using cables, a backplane, a midplane, etc.).

What is claimed is:

1. A system, comprising:
a chassis having a first portion and a second portion, the first portion defining a plurality of horizontal slots, the second portion defining a plurality of vertical slots;
a first plurality of line cards disposed within the plurality of horizontal slots, each line card from the first plurality of line cards having a plurality of ports, each line card from the first plurality of line cards having a depth substantially similar to a depth of the chassis; and
a second plurality of line cards disposed within the plurality of vertical slots, each line card from the second plurality of line cards having a plurality of ports,
each port from the plurality of ports of a line card from the first plurality of line cards being operatively coupled to a different line card from the second plurality of line cards when the system is in a first configuration,
a first set of ports from the plurality of ports of the line card from the first plurality of line cards being operatively coupled to a first line card from the second plurality of line cards and a second set of ports from the plurality of ports of the line card from the first plurality of line cards being operatively coupled to a second line card from the second plurality of line cards when the system is in a second configuration, the first set of ports and the second set of ports being mutually exclusive.

2. The system of claim 1, wherein the chassis includes a third portion, the third portion defining a plurality of horizontal slots, the second portion of the chassis being disposed between the first portion and the third portion.

3. The system of claim 1, wherein the system can be moved between the first configuration and the second configuration while maintaining operation of the system.

4. The system of claim 1, wherein the first plurality of line cards includes a number of line cards when in the first configuration, the first plurality of line cards including less than the number of line cards when in the second configuration.

5. The system of claim 1, wherein each line card from the first plurality of line cards is associated with a first stage and a third stage of a multi-stage switch, each line card from the second plurality of line cards being associated with a second stage of the multi-stage switch.

6. The system of claim 1, wherein each port from the plurality of ports of the line card from the first plurality of line cards is operatively coupled to a different line card from the second plurality of line cards via a cable when the system is in the first configuration.

7. A system, comprising:
- a chassis defining a plurality of horizontal slots and a plurality of vertical slots;
- a first line card disposed within a horizontal slot from the plurality of horizontal slots, the first line card being associated with a first stage and a third stage of a multi-stage switch, the first line card having a plurality of ports;
- a second line card disposed within a first vertical slot from the plurality of vertical slots, the second line card having a plurality of ports; and
- a third line card disposed within a second vertical slot from the plurality of vertical slots, the third line card having a plurality of ports, the second line card and the third line card being associated with a second stage of the multi-stage switch,
- a first port from the plurality of ports of the first line card being operatively coupled to a port from the plurality of ports of the second line card via a first cable, a second port from the plurality of ports of the first line card being operatively coupled to a port from the plurality of ports of the third line card via a second cable.

8. The system of claim 7, wherein the chassis defines a vertical axis, the plurality of vertical slots being disposed between a first set of horizontal slots from the plurality of horizontal slots and a second set of horizontal slots from the plurality of horizontal slots.

9. The system of claim 7, wherein the first line card, the second line card and the third line card are substantially similar.

10. The system of claim 7, wherein the plurality of horizontal slots includes twice as many slots as the plurality of vertical slots.

11. The system of claim 7, wherein the second line card defines a first vertical axis and the third line card defines a second vertical axis, the first port from the plurality of ports of the first line card is substantially aligned with the first vertical axis, the second port from the plurality of ports of the first line card is substantially aligned with the second vertical axis.

12. The system of claim 7, wherein the plurality of ports of the first line card are configured to be operatively coupled to optical cables and electrical cables.

13. The system of claim 7, wherein each horizontal slot from the plurality of horizontal slots defines a volume substantially similar to a volume defined by each vertical slot from the plurality of vertical slots.

14. The system of claim 7, wherein the chassis has a depth substantially similar to a depth of the first line card.

15. The system of claim 7, wherein the plurality of ports of the first line card are a first plurality of ports of the first line card, the first plurality of ports being disposed on a first surface of the first line card,
the first line card having a second plurality of ports disposed on a second surface of the first line card different from the first surface, the second plurality of ports configured to be operatively coupled to at least one edge device configured to send signals to and receive signals from the multi-stage switch.

16. An apparatus, comprising:
- a chassis having a first portion and a second portion, the first portion defining a plurality of horizontal slots, the second portion defining a plurality of vertical slots, the first portion and the second portion being mutually exclusive; and
- a plurality of line cards associated with a multi-stage switch having a first configuration and a second configuration,
- a first line card from the plurality of line cards being disposed within a horizontal slot from the plurality of horizontal slots when the multi-stage switch is in the first configuration and the second configuration, the first line card includes a plurality of ports and is associated with a first stage and a final stage of the multi-stage switch,
- a second line card from the plurality of line cards being disposed within a first vertical slot from the plurality of vertical slots and a third line card from the plurality of line cards being disposed within a second vertical slot from the plurality of vertical slots when the multi-stage switch is in the first configuration and the second configuration, the second line card and the third line card being associated with a second stage of the multi-stage switch,
- a fourth line card from the plurality of line cards being disposed within a third vertical slot from the plurality of vertical slots and a fifth line card from the plurality of line cards being disposed within a fourth vertical slot from the plurality of vertical slots when the multi-stage switch is in the second configuration, the fourth line card and the fifth line card being associated with the second stage of the multi-stage switch,
- a first set of ports from the plurality of ports being operatively coupled to the second line card and a second set of ports from the plurality of ports being operatively coupled to the third line card via a plurality of cables when the multi-stage switch is in the first configuration,
- a first subset of ports from the first set of ports being operatively coupled to the second line card, a first subset of ports from the second set of ports being operatively coupled to the third line card, a second subset of ports from the first set of ports being operatively coupled to the fourth line card and a second subset of ports from the second set of ports being operatively coupled to the fifth line card when the multi-stage switch is in the second configuration.

17. The apparatus of claim 16, wherein the multi-stage switch is configured to be operatively coupled to a first number of edge devices when in the first configuration, the multi-stage switch being configured to be operatively coupled to a second number of edge devices greater than the first number when in the second configuration.

18. The apparatus of claim 16, wherein the plurality of horizontal slots is a first plurality of horizontal slots, the chassis having a third portion defining a second plurality of horizontal slots,
- a sixth line card from the plurality of line cards being disposed within a horizontal slot from the second plurality of horizontal slots when the multi-stage switch is in the first configuration and the second configuration, the sixth line card being associated with the first stage and the final stage of the switch fabric,
- the second portion of the chassis being disposed between the first portion of the chassis and the third portion of the chassis.

19. The apparatus of claim 16, wherein the plurality of ports is a first plurality of ports, the first line card has a second plurality of ports, the second plurality of ports being operatively coupled to a first plurality of edge devices, the first plurality of edge devices configured to send signals to and receive signals from a second plurality of edge devices when the switch fabric is in the first configuration, the first plurality of edge devices configured to send signals to and receive signals from the second plurality of edge devices and a third plurality of edge devices when the switch fabric is in the second configuration.

20. The apparatus of claim 16, wherein a depth of the first portion of the chassis is substantially similar to a depth of the first line card.

* * * * *